(12) United States Patent
Sakamoto et al.

(10) Patent No.: US 11,572,119 B2
(45) Date of Patent: Feb. 7, 2023

(54) VEHICLE PARTS ASSEMBLY METHOD AND VEHICLE PARTS ASSEMBLY APPARATUS

(71) Applicant: Toyota Jidosha Kabushiki Kaisha, Toyota (JP)

(72) Inventors: Tomotaka Sakamoto, Toyota (JP); Motoyasu Machino, Toyota (JP); Atsushi Imamizu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/387,429

(22) Filed: Jul. 28, 2021

(65) Prior Publication Data

US 2022/0033019 A1 Feb. 3, 2022

(30) Foreign Application Priority Data

Jul. 30, 2020 (JP) .............................. JP2020-129447

(51) Int. Cl.
*B62D 65/02* (2006.01)
*B62D 65/12* (2006.01)
*B62D 27/06* (2006.01)

(52) U.S. Cl.
CPC ......... *B62D 65/028* (2013.01); *B62D 27/065* (2013.01); *B62D 65/12* (2013.01)

(58) Field of Classification Search
CPC .... B62D 65/028; B62D 27/065; B62D 65/12; B62D 65/005
See application file for complete search history.

(56) References Cited

U.S. PATENT DOCUMENTS 3,224,322 A * 12/1965 Westbrook ......... G01B 11/2433
209/939

FOREIGN PATENT DOCUMENTS

| JP | 2006264521 A | 10/2006 |
| JP | 2008170331 A | 7/2008 |
| JP | 2020071725 A | 5/2020 |

* cited by examiner

*Primary Examiner* — Rick K Chang
(74) *Attorney, Agent, or Firm* — Dinsmore & Shohl LLP

(57) ABSTRACT

A method of assembling vehicle parts, the method including: measuring at least one of a dimension or a characteristic of each of plural types of vehicle parts, and, for types of vehicle parts of which there are plural in stock, measuring at least one of a dimension or a characteristic of each one of the plural vehicle parts that are in stock; determining a combination of the plural types of vehicle parts by selecting specific vehicle parts from among the types of vehicle parts of which there are plural in stock, such that the selected specific vehicle parts closely approximate specific vehicle specification reference values; and assembling the plural types of vehicle parts in accordance with the combination that has been determined.

7 Claims, 19 Drawing Sheets

FIG.5
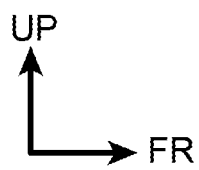
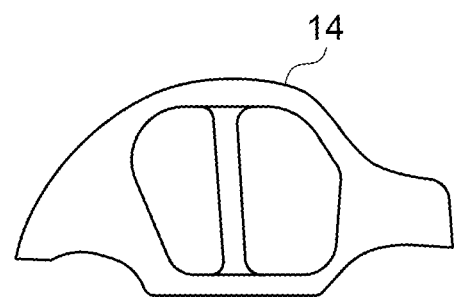
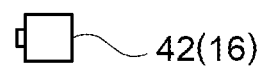
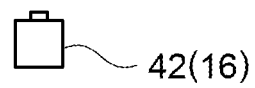

VEHICLE PARTS ASSEMBLY METHOD AND VEHICLE PARTS ASSEMBLY APPARATUS

CROSS-REFERENCE TO RELATED APPLICATION

This application is based on and claims priority under 35 USC 119 from Japanese Patent Application No. 2020-129447 filed on Jul. 30, 2020, the disclosure of which is incorporated by reference herein.

BACKGROUND

Technical Field

The present disclosure relates to a vehicle parts assembly method and a vehicle parts assembly apparatus.

Related Art

An assembly inspection method in which an evaluation is made of the quality of an assembly of parts that are used to form a vehicle is disclosed in Japanese Unexamined Patent Application Laid-Open (JP-A) No. 2008-170331. In the assembly inspection method described in this publication, a master image is acquired in advance to serve as a reference for the parts that are to be assembled. Moreover, an actual image is also acquired of the parts when they are actually assembled. An evaluation is then made of the quality of the assembly of the parts based on correlation values between the master image and the actual image.

The assembly inspection method disclosed in JP-A No. 2008-170331 is a useful method from the viewpoint of evaluating the quality of an assembly of parts after the assembling of the parts has been completed, however, there is room for improvement from the standpoint of improving the accuracy of vehicle specifications of a completed vehicle that is formed so as to include a plurality of types of vehicle parts as compared to reference values.

SUMMARY

In consideration of the above-described circumstances, it is an object of the present disclosure to provide a vehicle parts assembly method and a vehicle parts assembly apparatus that enable the accuracy of vehicle specifications of a completed vehicle that is formed so as to include a plurality of types of vehicle parts to be improved relative to reference values.

A vehicle parts assembly method of a first aspect of the present disclosure includes measuring at least one of a dimension or a characteristic of each of a plurality of types of vehicle parts, and, for types of vehicle parts of which there are a plurality in stock, measuring at least one of a dimension or a characteristic of each one of the plurality of vehicle parts that are in stock; determining a combination of the plurality of types of vehicle parts by selecting specific vehicle parts from among the types of vehicle parts of which there are a plurality in stock, such that the selected specific vehicle parts closely approximate specific vehicle specification reference values; and assembling the plurality of types of vehicle parts in accordance with the combination that has been determined.

According to the vehicle parts assembly method of the first aspect, at least one of dimensions or characteristics are measured for each of a plurality of types of vehicle parts. In the case of types of vehicle parts of which there are a plurality of those parts in stock, at least one of dimensions or characteristics of each one of the plurality of vehicle parts of that type is measured (measuring process). Next, specific vehicle parts are selected from among the vehicle parts types of which there are a plurality in stock such that the selected vehicle parts closely approximate specific vehicle specification reference values, and a combination of the plurality of types of vehicle parts is determined (combining process). Next, a plurality of types of vehicle parts are assembled using the plurality of types of vehicle parts whose combination was determined in the combining process (assembling process). Here, according to the vehicle parts assembly method of the first aspect, specific vehicle parts are selected from among the types of vehicle parts of which there are a plurality of those parts in stock such that the selected vehicle parts closely approximate specific vehicle specification reference values, and a combination of the plurality of types of vehicle parts is determined. As a result, it is possible to improve the accuracy, relative to reference values, of specific vehicle specifications of a completed vehicle that is formed so as to include a plurality of types of vehicle parts whose combination has been determined in combining process.

A vehicle parts assembly method of a second aspect of the present disclosure is characterized in that, in the vehicle parts assembly method of the first aspect, there is further included positioning, by determining mutual positions relative to each other, of the plurality of types of vehicle parts selected for the determined combination, in order to closely approximate the specific vehicle specification reference values, wherein the assembling includes assembling the plurality of types of vehicle parts at the mutual positions relative to each other determined in the positioning.

According to the vehicle part assembly method of the second aspect of the present disclosure, after the combining process, mutual positions relative to each other of the plurality of types of vehicle parts whose combination was determined in the combining process are determined (positioning process). Next, the plurality of types of vehicle parts are assembled in mutual positions relative to each other that were determined in the positioning process (assembling process). As a result, compared with a case in which no positioning process is performed, it is possible to improve the accuracy, relative to reference values, of specific vehicle specifications of a completed vehicle that is formed so as to include a plurality of types of vehicle parts whose combination was determined in the combining process.

A vehicle parts assembly method of a third aspect of the present disclosure is characterized in that, in the vehicle parts assembly method of the second aspect, the positioning includes determining the mutual positions relative to each other of the plurality of types of vehicle parts under an assumption that the mutual positions relative to each other of the plurality of types of vehicle parts can only be moved by an amount that corresponds to a clearance between bolts and insertion holes into which the bolts are inserted, and the assembling includes assembling the plurality of types of vehicle parts using the bolts.

According to the vehicle part assembly method of the third aspect of the present disclosure, the plurality types of vehicle parts are assembled in consideration of the clearance between bolts and insertion holes into which the bolts are inserted. As a consequence, compared with a case in which the assembling process is performed without considering this clearance, it is possible to improve the accuracy, relative to reference values, of specific vehicle specifications of a completed vehicle that is formed so as to include a plurality of types of vehicle parts whose combination was determined in the combining process.

A vehicle parts assembly method of a fourth aspect of the present disclosure is characterized in that, in the vehicle parts assembly method of any one of the first through third aspects, selecting the specific vehicle parts includes prioritizing vehicle parts having an earliest procurement date among the types of vehicle parts of which there are a plurality in stock.

According to the vehicle part assembly method of the fourth aspect of the present disclosure, in the combining process, the specific vehicle parts are selected with priority given to those vehicle parts having the oldest procurement date from among the types of vehicle parts of which there are a plurality in stock. Because of this, it is possible to inhibit vehicle parts that were procured at an early date from among the types of vehicle parts of which there are a plurality in stock from continuing to remain in stock.

A vehicle parts assembly method of a fifth aspect of the present disclosure is characterized in that, in the vehicle parts assembly method of any one of the first through fourth aspects, the plurality of types of vehicle parts include parts forming an undercarriage of a vehicle, and the specific vehicle specifications include at least one of a camber angle, a caster angle, a position of a vehicle wheel in a vehicle front-rear direction, a position of a vehicle wheel in a vehicle width direction, or a vehicle height.

According to the vehicle part assembly method of the fifth aspect of the present disclosure, it is possible to improve the accuracy of at least one of a camber angle, a caster angle, a position of a vehicle wheel in a vehicle front-rear direction, a position of a vehicle wheel in a vehicle width direction, and a vehicle height in relation to reference values.

A vehicle parts assembly method of a sixth aspect of the present disclosure is characterized in that, in the vehicle parts assembly method of any one of the first through fourth aspects, the plurality of types of vehicle parts include parts used to form brakes of a vehicle, and the specific vehicle specifications include braking force.

According to the vehicle part assembly method of the sixth aspect of the present disclosure, it is possible to improve the accuracy of the braking force of a completed vehicle relative to the reference values.

A vehicle parts assembly apparatus of a seventh aspect of the present disclosure includes: a measurement data recording unit configured to store measurement data for at least one of a dimension or a characteristic of a plurality of types of vehicle parts, and, for types of vehicle parts of which there are a plurality in stock, measurement data for at least one of a dimension or a characteristic of each one of the plurality of vehicle parts that are in stock; and a combination determination unit configured to, based on the measurement data stored in the measurement data recording unit, select specific vehicle parts from among the types of vehicle parts of which there are a plurality in stock such that the selected vehicle parts closely approximate specific vehicle specification reference values, and determine a combination of the plurality of types of vehicle parts.

According to the vehicle part assembly apparatus of the seventh aspect of the present disclosure, measurement data for at least one of dimensions or characteristics for each one of a plurality of types of vehicle parts is recorded in a measurement data recording unit. Moreover, in a case of types of vehicle parts of which there are a plurality in stock, measurement data for at least one of dimensions or characteristics of each one of the plurality of vehicle parts of that type is also recorded in the measurement data recording unit. Next, based on the measurement data recorded in the measurement data recording unit, a combination deciding unit selects specific vehicle parts from among the types of vehicle parts of which there are a plurality in stock so as to closely approximate specific vehicle specification reference values, and then decides on a combination of the plurality of types of vehicle parts. By then assembling the plurality of types of vehicle parts whose combinations have been determined by the combination deciding unit, it is possible to improve the accuracy, relative to reference values, of specific vehicle specifications of a completed vehicle that is formed so as to include a plurality of types of vehicle parts.

A vehicle parts assembly apparatus of an eighth aspect of the present disclosure is characterized in that, the vehicle parts assembly apparatus of the seventh aspect further includes: a position determination unit configured to determine mutual positions relative to each other of the plurality of types of vehicle parts in accordance with the combination determined by the combination determination unit in order to closely approximate the specific vehicle specification reference values; and a part support unit configured to support the plurality of types of vehicle parts at the mutual positions relative to each other determined by the position determination unit.

According to the vehicle part assembly apparatus of the eighth aspect of the present disclosure, a position deciding unit decides on mutual positions relative to each other of the plurality of types of vehicle parts whose combination was determined by the combination deciding unit in order to closely approximate the specific vehicle specification reference values. Next, a part supporting unit supports the plurality of types of vehicle parts at mutual positions relative to each other that have been determined by the position deciding unit. By then assembling the plurality of types of vehicle parts while they are being supported by the part supporting unit, it is possible to improve the accuracy, relative to reference values, of specific vehicle specifications of a completed vehicle that is formed so as to include this plurality of types of vehicle parts.

The vehicle parts assembly method and vehicle parts assembly apparatus according to the present disclosure provide the superior effect of enabling the accuracy, relative to reference values, of vehicle specifications of a completed vehicle that is formed so as to include a plurality of types of vehicle parts to be improved.

BRIEF DESCRIPTION OF THE DRAWINGS

Exemplary embodiments of the present disclosure will be described in detail based on the following figures, wherein:

FIG. 5 is a side view showing a vehicle body and a camera used for making measurements;

DETAILED DESCRIPTION

FIG. 1 through FIG. 15 illustrate a vehicle part assembly apparatus and a vehicle part assembly method according to an exemplary embodiment of the present disclosure.

Figure 1:
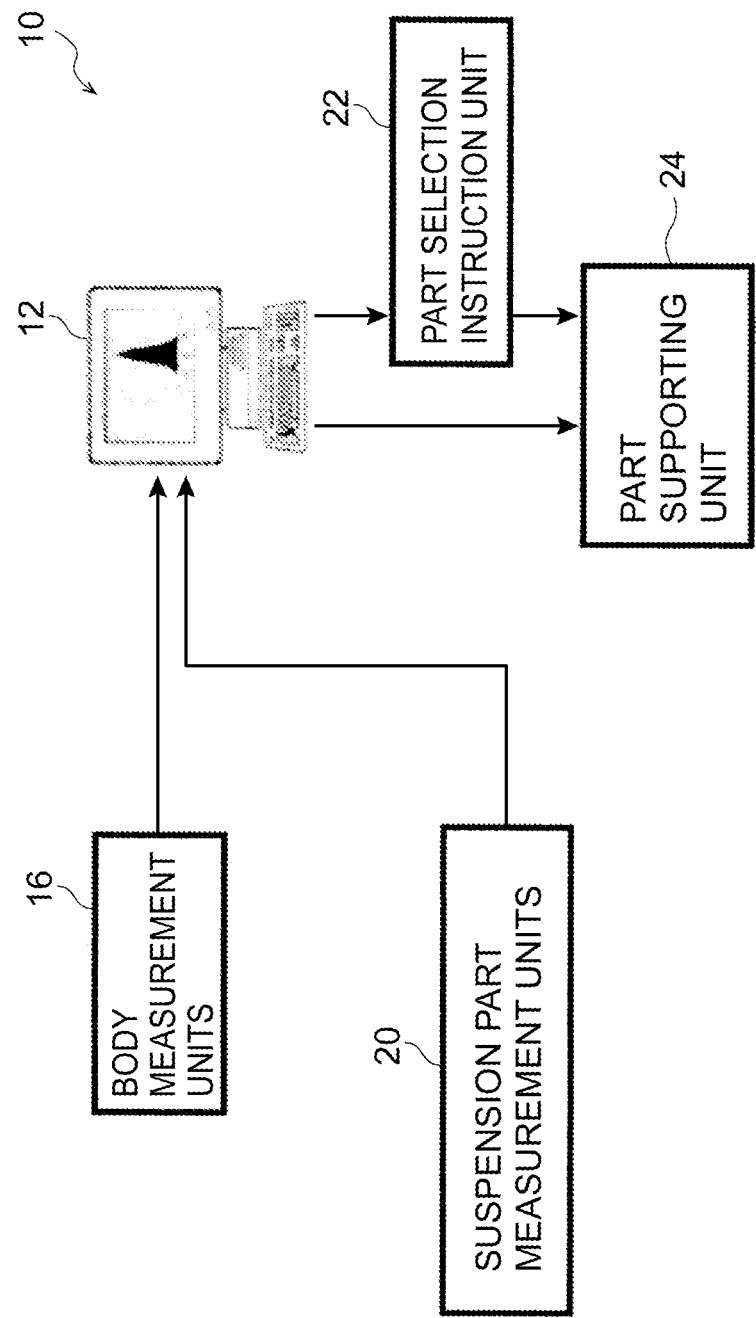
FIG. 1 is a view schematically showing a vehicle part assembly apparatus of the present exemplary embodiment.

As is shown in FIG. 1, a vehicle part assembly apparatus 10 of the present exemplary embodiment is provided with a recording and calculation unit 12 in which data is recorded, and that performs calculations and the like based on the recorded data. Note that, in the following description, the 'vehicle part assembly apparatus 10' is referred to simply as the 'assembly apparatus 10'. The assembly apparatus 10 is provided with body measurement units 16 that measure a body 14 (see FIG. 2), and suspension part measurement units 20 that measure each part that is used to form a front suspension 18 (see FIG. 4). In addition, the assembly apparatus 10 is also provided with a part selection instruction unit 22 that instructs that a part determined by the recording and calculation unit 12 be selected, and a part supporting unit 24 that supports, in a predetermined state, a plurality of parts that have been transported to an assembly work unit after having undergone the selection process of the part selection instruction unit 22. By employing this assembly apparatus 10, it is possible to reduce deviation, relative to reference values, of a camber angle $\theta1$, a caster angle $\theta2$, a vehicle front-rear position IL of a vehicle wheel 28, and a position IW in a vehicle width direction of the vehicle wheel 28, which are all vehicle specifications of a vehicle 26 shown in FIG. 2 and FIG. 3.

Next, the front suspension 18 will be described. Subsequent to that, a method of assembling the front suspension 18, and a method of mounting the front suspension 18 onto the body 14 will be described as vehicle part assembly methods in which the above-described assembly apparatus 10 is employed.

Figure 4:
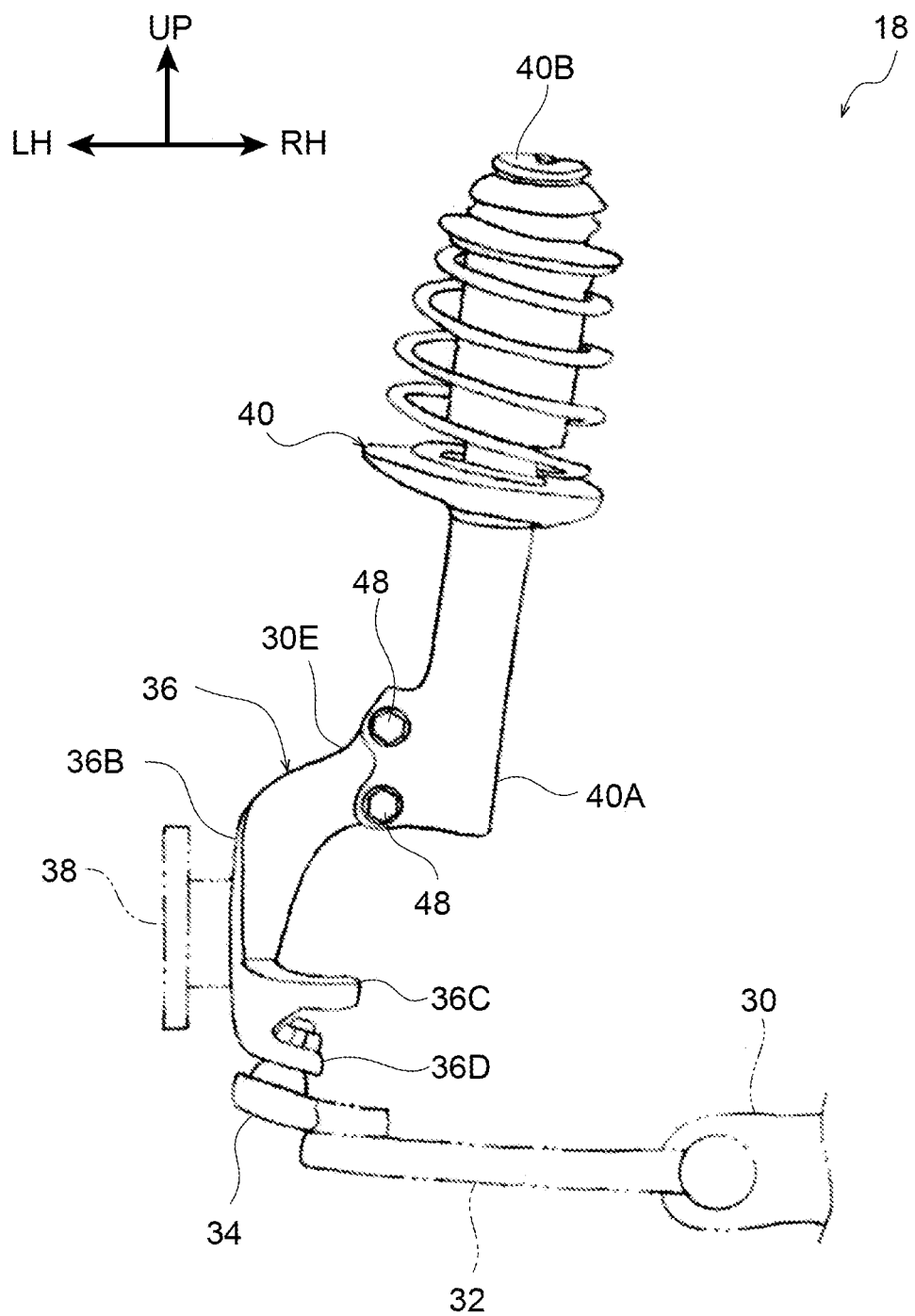
FIG. 4 is a front view showing a portion of a front suspension of a vehicle.

As is shown in FIG. 4, the front suspension 18 is provided with a suspension member 30, a pair of left and right lower arms 32 that are mounted on the suspension member 30 so as to be able to move tiltingly relative thereto, and a pair of left and right knuckles 36 that are mounted respectively via a ball joint 34 on the pair of left and right lower arms 32. A hub 38 onto which a vehicle wheel is mounted is rotatably supported by the pair of left and right knuckles 36. In addition, the front suspension 18 is also provided with a pair of left and right coilovers 40 that respectively connect the pair of left and right knuckles 36 to the body 14 (see FIG. 5). Note that only portions of the front suspension 18 located on the left side are shown in FIG. 4. Furthermore, in the following description, if front-rear, up-down, or left-right directions are used in the following description, then these refer respectively to the front-rear directions, the up-down directions, and the left-right directions of the vehicle 26. Moreover, an arrow FR, an arrow UP, and an arrow RH that are shown in the appropriate drawings respectively indicate a forward direction, an upward direction, and a right-side direction of the vehicle.

Figure 6:
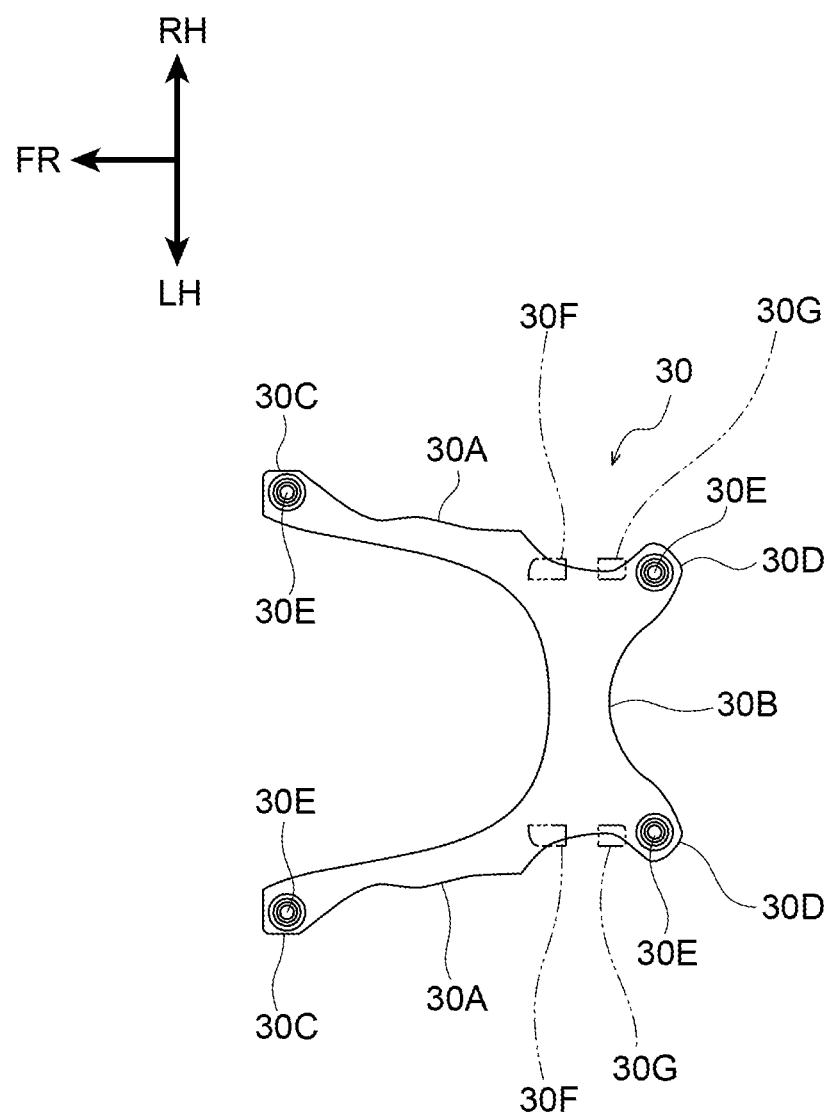
FIG. 6 is a plan view showing a suspension member.

As is shown in FIG. 6, the suspension member 30 is provided with a pair of left and right side portions 30A that are disposed at a distance from each other in the left-right direction and extend in the front-rear direction, and a connecting portion 30B that connects rearward sides of the pair of left and right side portions 30A together in the left-right direction. Front end portions of the pair of left and right side portions 30A form front-side mounting portions 30C that are mounted respectively on a pair of left and right front side members or the like (not shown in the drawings) that form part of the body 14 (see FIG. 5). Rear end portions of the pair of left and right side portions 30A form rear-side mounting portions 30D that are mounted respectively on a pair of left and right front side members-rear or the like (not shown in the drawings) that form part of the body 14. Insertion holes 30E through which bolts (not shown in the drawings) are inserted are formed respectively in the front-side mounting portions 30C and the rear-side mounting portions 30D. As a result of bolts that are inserted into these insertion holes 30E being screwed into nut portions (not shown in the drawings) that are provided on the body 14 side, the suspension member 30 is mounted on the body 14. In addition, front-side lower arm mounting portions 30F and rear-side lower arm mounting portions 30G, onto which a pair of left and right lower arms 32 (described below) are mounted, are provided respectively in portions of the pair of left and right side portions 30A that correspond to the connecting portion 30B.

Figure 7:
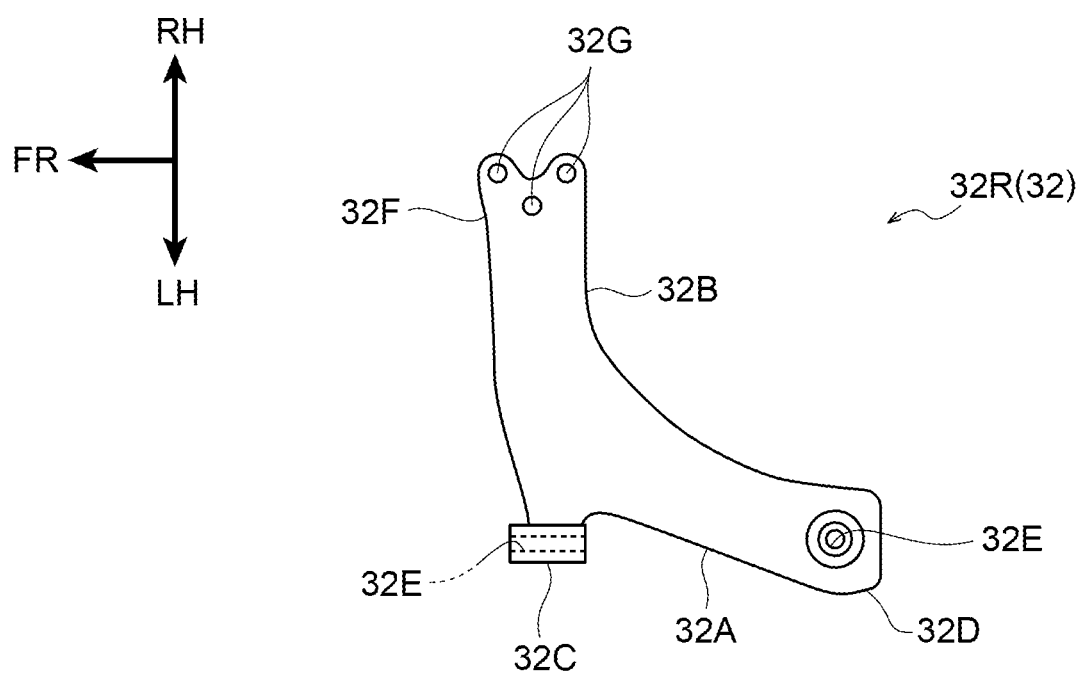
FIG. 7 is a plan view showing a right-side lower arm.
Figure 8:
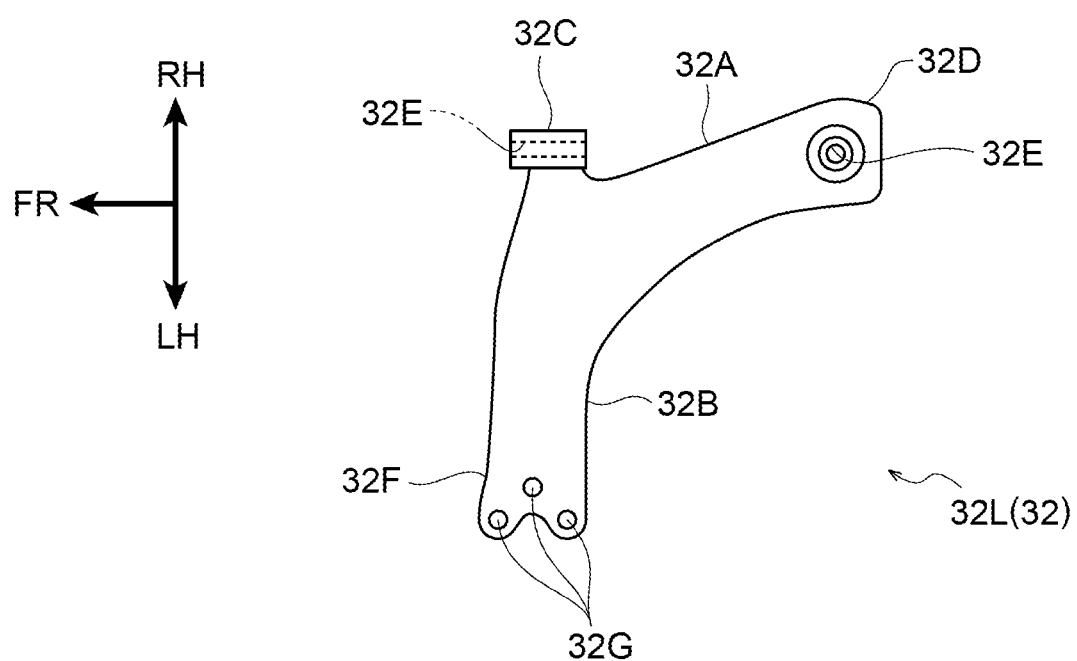
FIG. 8 is a plan view showing a left-side lower arm.

The right-side lower arm 32 is shown in FIG. 7, while the left-side lower arm 32 is shown in FIG. 8. As is shown in these drawings, the pair of left and right lower arms 32 are formed so as to be symmetrical in the left-right direction. Note that, in the following description, when a distinction is made between the right-side lower arm 32 and the left-side lower arm 32, the right-side lower arm 32 is described as a 'lower arm 32R', while the left-side lower arm 32 is described as a 'lower arm 32L'. More specifically, the lower arms 32 are each provided with a first arm portion 32A that extends from the rear side so as to incline progressively towards an outward side in the vehicle width direction as it approaches the front side, and a second arm portion 32B that extends from a front-end side of the first arm portion 32A towards the outward side in the vehicle width direction. A front end portion of the first arm portion 32A forms a front-side mounting portion 32C that is mounted on the front-side lower arm mounting portion 30F of the suspension member 30. A rear end portion of the first arm portion 32A forms a rear-side mounting portion 32D that is mounted on the rear-side lower arm mounting portion 30G of the suspension member 30. Insertion holes 32E through which bolts (not shown in the drawings) are inserted are formed respectively in the front-side mounting portions 30C and the rear-side mounting portions 30D. When a bolt has been inserted into the insertion hole 32E in the front-side mounting portion 32C and through the front-side lower arm mounting portion 30F of the suspension member 30, a nut is screwed onto an end portion of this bolt. In the same way, a bolt is inserted into the insertion hole 32E in the rear-side mounting portion 32D and is screwed into a nut portion provided on the rear-side lower arm mounting portion 30G of the suspension member 30. As a result, the lower arm 32 is mounted onto the suspension member 30. An end portion on the outward side in the vehicle width direction of the second arm portion 3B forms a ball joint mounting portion 32F onto which the ball joint 34 is mounted. Three insertion holes 32G through which bolts (not shown in the drawings) are inserted) are formed in this ball joint mounting portion 32F. The bolt that is inserted into one insertion hole 32G out of these three insertion holes 32G is screwed into a nut portion that is provided in the ball joint 34, and nuts are screwed onto end portions of the bolts (these bolts are fixed to the ball joint 34 side) that are inserted into the other two insertion holes 32G out of the three insertion holes 32G. As a result, the ball joint 34 is mounted onto the ball joint mounting portion 32F.

Figure 9:
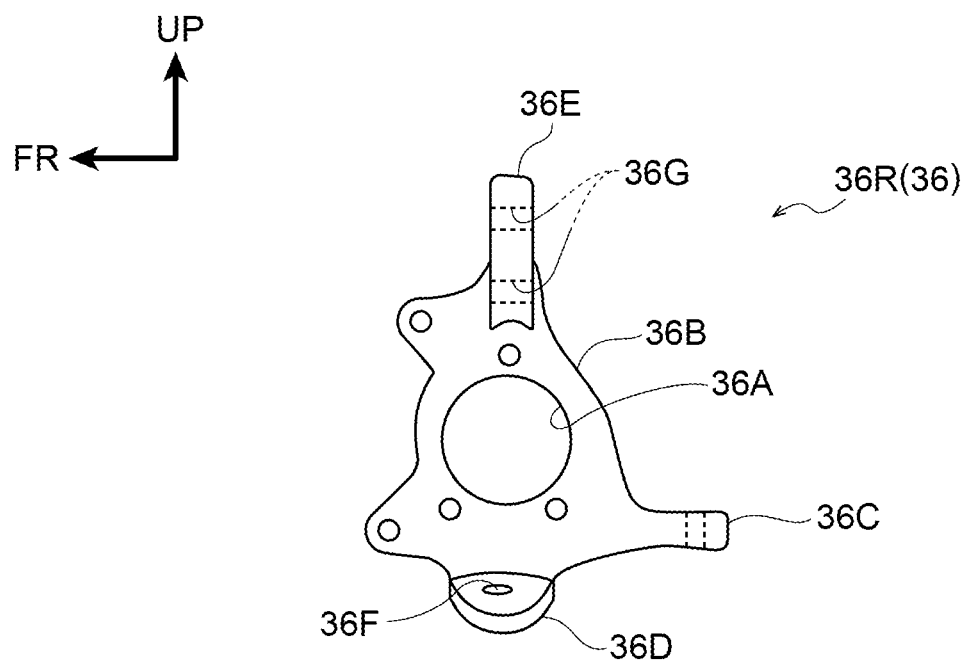
FIG. 9 is a side view showing a right-side knuckle.
Figure 10:
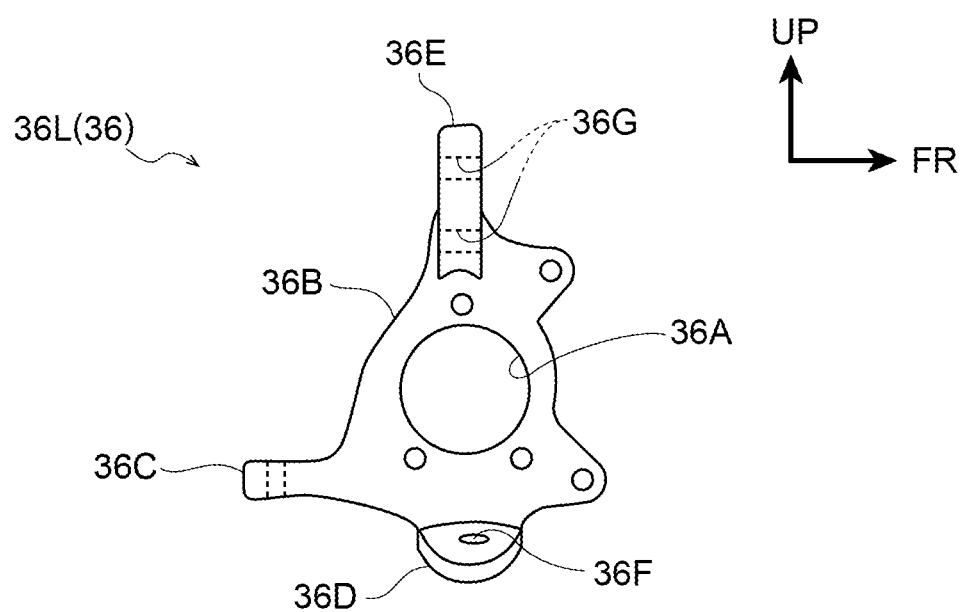
FIG. 10 is a side view showing a left-side knuckle.

The right-side knuckle 36 is shown in FIG. 9, while the left-side knuckle 36 is shown in FIG. 10. As is shown in these drawings, the knuckles 36 are formed so as to be symmetrical in the left-right direction. Note that, in the following description, when a distinction is made between the right-side knuckle 36 and the left-side knuckle 36, the right-side knuckle 36 is described as a 'knuckle 36R', while the left-side knuckle 36 is described as a 'knuckle 36L'. More specifically, each knuckle 36 is provided with a knuckle main body portion 36B in which is formed an aperture 36A inside which is disposed a hub bearing (not shown in the drawings), and a tie rod end connecting portion 36C that protrudes towards the rearward side from the knuckle main body portion 36B. Additionally, each knuckle 36 is provided with a ball joint mounting portion 36D that protrudes towards an inward side in the vehicle width direction from a lower end portion of the knuckle main body portion 36B, and a coilover mounting portion 36E that protrudes towards the inward side in the vehicle width direction and towards an upward side from an upper end portion of the knuckle main body portion 36B. A shaft portion insertion hole 36F into which is inserted a shaft portion that protrudes from a ball portion of the ball joint 34 is formed in the ball joint mounting portion 36D. As a result of a nut being screwed onto an end portion of the shaft portion that is inserted into this shaft portion insertion hole 36F, the knuckle 36 is mounted onto the lower arm 32 via the ball joint 34. Two insertion holes 36G which are disposed at a distance from each other in the up-down direction and through which are inserted two bolts (not shown in the drawings) respectively are formed in the coilover mounting portion 36E. As a result of nuts being screwed onto end portions of the two bolts that have been inserted into the two insertion holes 36G and lower end portions 40A of the coilovers 40, the lower end portions 40A of the coilovers 40 are mounted onto the coilover mounting portion 36E.

Next, a method of assembling the front suspension 18 and a method of mounting the front suspension 18 onto the body 14 using the assembly apparatus 10 shown in FIG. 1 will be described.

Figure 11:
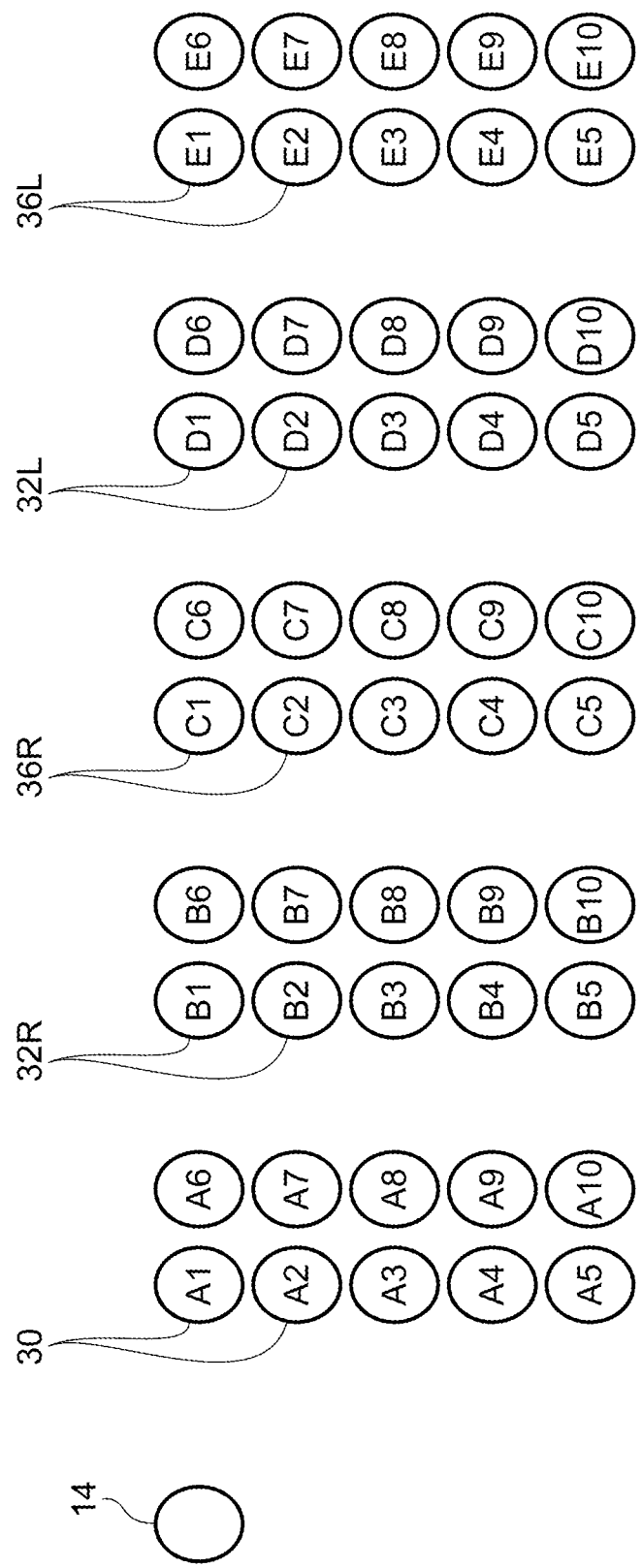
FIG. 11 is a schematic view showing stocks of each part used to form a vehicle front suspension.

The body 14 onto which the front suspension 18 is mounted, and the respective parts (i.e., the suspension member 30, the right-side lower arm 32R, the right-side knuckle 36R, the left-side lower arm 32L, and the left-side knuckle 36L) used to form the front suspension 18 are shown schematically in FIG. 11. As is shown in FIG. 11, the number of parts held in stock of each of the suspension member 30, the right-side lower arm 32R, the right-side knuckle 36R, the left-side lower arm 32L, and the left-side knuckle 36L is ten.

Firstly, as is shown in FIG. 1, FIG. 5, and FIG. 11, the body 14 is measured using the body measurement units 16. Note that, in the present exemplary embodiment, the body 14 is measured using cameras 42 as the body measurement units 16, however, it is also possible to measure the body 14 using other body measurement units 16 such as coordinate measuring machines or the like. Here, the dimensions of each part of the body 14 are measured, and the position and angle and the like of portions of the body 14 where the suspension member 30 and the upper end portion 40B of the coilover are mounted are measured. The resulting measurement values are recorded in the recording and calculation unit 12 either automatically or manually.

Next, as is shown in FIG. 1, FIG. 6, and FIG. 11, the suspension member 30 is measured using the suspension part measurement units 20. Note that, in the same way as for the body measurement units 16, this measurement is performed using the cameras 42 as the suspension part measurement units 20. Here, the dimensions of each part of the suspension member 30, and the position and angle and the like of the front-side mounting portions 30C, the rear-side mounting portions 30D, the front-side lower arm mounting portions 30F, and the rear-side lower arm mounting portions 30G are measured. These measurements of the suspension member 30 are repeated for all of the ten items held in stock. The resulting measurement values of the ten suspension members 30 are each recorded in the recording and calculation unit 12 either automatically or manually. In addition, data for the procurement dates of each of the ten suspension members 30 is also recorded in the recording and calculation unit 12 either automatically or manually. Note that, in order to simplify the description, identification numbers A1-A10 have been attached respectively to the ten suspension members 30, however, in reality, it is possible for the ten suspension members 30 to be identified by QR tags or the like. The same is true in the case of other identification numbers in the description below as well.

Next, as is shown in FIG. 1, FIG. 7, and FIG. 11, the right-side lower arm 32R is measured using the suspension part measurement units 20. Here, the dimensions of each part of the right-side lower arm 32R, and the position and angle and the like of the front-side mounting portions 32C, the rear-side mounting portions 32D, and the ball joint mounting portion 32F are measured. These measurements of the right-side lower arm 32R are repeated for all of the ten items held in stock. The resulting measurement values of the ten right-side lower arms 32R are each recorded in the recording and calculation unit 12 either automatically or manually. In addition, data for the procurement dates of each of the ten right-side lower arms 32R is also recorded in the recording and calculation unit 12 either automatically or manually. Note that identification numbers B1-B10 are attached respectively to the ten right-side lower arms 32R.

Next, as is shown in FIG. 1, FIG. 9, and FIG. 11, the right-side knuckle 36R is measured using the suspension part measurement units 20. Here, the dimensions of each part of the right-side knuckle 36R, and the position and angle and the like of the knuckle main body portion 36B, the ball joint mounting portion 36D, and the coilover mounting portion 36E are measured. These measurements of the right-side knuckle 36R are repeated for all of the ten items held in stock. The resulting measurement values of the ten right-side knuckles 36R are each recorded in the recording and calculation unit 12 either automatically or manually. In addition, data for the procurement dates of each of the ten right-side knuckles 36R is also recorded in the recording and calculation unit 12 either automatically or manually. Note that identification numbers C1-C10 are attached respectively to the ten right-side knuckles 36R.

Next, as is shown in FIG. 1, FIG. 8, and FIG. 11, the left-side lower arm 32L is measured using the suspension part measurement units 20. Here, the dimensions of each part of the left-side lower arm 32L, and the position and angle and the like of the front-side mounting portions 32C, the rear-side mounting portions 32D, and the ball joint mounting portion 32F are measured. These measurements of the left-side lower arm 32L are repeated for all of the ten items held in stock. The resulting measurement values of the ten left-side lower arms 32L are each recorded in the recording and calculation unit 12 either automatically or manually. In addition, data for the procurement dates of each of the ten left-side lower arms 32L is also recorded in the recording and calculation unit 12 either automatically or manually. Note that identification numbers D1-D10 are attached respectively to the ten left-side lower arms 32L.

Next, as is shown in FIG. 1, FIG. 10, and FIG. 11, the left-side knuckle 36L is measured using the suspension part measurement units 20. Here, the dimensions of each part of the left-side knuckle 36L, and the position and angle and the like of the knuckle main body portion 36B, the ball joint mounting portion 36D, and the coilover mounting portion 36E are measured. These measurements of the left-side knuckle 36L are repeated for all of the ten items held in stock. The resulting measurement values of the ten left-side knuckles 36L are each recorded in the recording and calculation unit 12 either automatically or manually. In addition, data for the procurement dates of each of the ten left-side knuckles 36L is also recorded in the recording and calculation unit 12 either automatically or manually. Note that identification numbers E1-E10 are attached respectively to the ten left-side knuckles 36L.

The above-described process makes up the measurement process of the present disclosure, however, it is also possible for the sequence in which the respective parts are measured to be changed as is appropriate.

Next, as is shown in FIG. 1, FIG. 2, FIG. 3, and FIG. 11, based on the data for the respective parts obtained in the measurement process, the recording and calculation unit 12 selects respective parts from among the body 14, the ten suspension members 30, the ten right-side lower arms 32, the ten right-side knuckles 36, the ten left-side lower arms 32, and the ten left-side knuckles 36, and decides on optimum combinations thereof such that amounts of deviation relative to reference values of the camber angle θ1, the caster angle θ2, the vehicle front-rear position IL of the vehicle wheel 28, and the position IW in the vehicle width direction of the vehicle wheel 28 are reduced as much as possible.

Here, an absolute value of an amount of deviation of the front right-side camber angle θ1 relative to a reference value is taken as K1, an absolute value of an amount of deviation of the front left-side camber angle θ1 relative to a reference value is taken as K2, and an absolute value of a difference between the amount of deviation of the front right-side camber angle θ1 relative to the reference value and the amount of deviation of the front left-side camber angle θ1 relative to the reference value is taken as K3. In addition, an absolute value of an amount of deviation of the front right-side caster angle θ2 relative to a reference value is taken as L1, an absolute value of an amount of deviation of the front left-side caster angle θ2 relative to a reference value is taken as L2, and an absolute value of a difference between the amount of deviation of the front right-side caster angle θ2 relative to the reference value and the amount of deviation of the front left-side caster angle θ2 relative to the reference value is taken as L3. Furthermore, an absolute value of an amount of deviation of the vehicle front-rear position IL of the right-side vehicle wheel 28 relative to a reference value is taken as M1, an absolute value of an amount of deviation of the vehicle front-rear position IL of the left-side vehicle wheel 28 relative to a reference value is taken as M2, and an absolute value of a difference between the amount of deviation of the vehicle front-rear position IL of the right-side vehicle wheel 28 relative to the reference value and the amount of deviation of the vehicle front-rear position IL of the left-side vehicle wheel 28 relative to the reference value is taken as M3. Moreover, an absolute value of an amount of deviation of the position IW in the vehicle width direction of the right-side vehicle wheel 28 relative to a reference value is taken as N1, an absolute value of an amount of deviation of the position IW in the vehicle width direction of the left-side vehicle wheel 28 relative to a reference value is taken as N2, and an absolute value of a difference between the amount of deviation of the position IW in the vehicle width direction of the right-side vehicle wheel 28 relative to the reference value and the amount of deviation of the position IW in the vehicle width direction of the left-side vehicle wheel 28 relative to the reference value is taken as N3.

Next, in the present exemplary embodiment, under search conditions that will result in the sum of K1+K2+K3 being reduced to the minimum, in the sum of L1+L2+L3 being reduced to the minimum, and in the sum of M1+M2+M3 being reduced to the minimum, the recording and calculation unit 12 performs a search using both a genetic algorithm, and a sequential quadratic planning method, and obtains candidates for combinations of each part that will be optimal solution candidates (i.e., searches for optimal solution candidates).

Next, under search conditions that will result in the sum of K1+K2+K3 being equal to or less than a predetermined value, in the sum of L1+L2+L3 being equal to or less than a predetermined value, and in the sum of M1+M2+M3 being equal to or less than a predetermined value, the recording and calculation unit 12 makes a selection from among several of the candidates obtained in the optimal solution candidate search with priority given to those candidates having the oldest procurement date, and decides on a combination of the respective parts. Moreover, in a case in which there are a plurality of combinations having the same conditions, the recording and calculation unit 12 decides on a combination of parts for which the sum of K1+K2+K3+L1+L2+L3 is the smallest value (i.e., selects an optimal solution).

The above-described process is combining process, however, it is also possible for other search conditions to be employed as the search conditions used to decide on combinations of parts in the combining process.

Next, the recording and calculation unit 12 calculates and decides on mutual positions relative to each other of the respective parts that were selected in the above-described optimal solution selection such that the camber angle θ1, the caster angle θ2, the vehicle front-rear position IL of the vehicle wheel 28, and the position IW in the vehicle width direction of the vehicle wheel 28 closely approximate their respective reference values. Here, the recording and calculation unit 12 calculates and decides on the mutual positions relative to each other of the respective parts on the assumption that the mutual positions relative to each other of the respective parts may only be moved by an amount that corresponds to the clearance between bolts and the insertion holes into which those bolts are inserted. Note that this process is positioning process. Moreover, in this process, the calculations are made on the assumption that the outer diameter of each bolt is at the maximum tolerance value, and that the inner diameter of each insertion hole is at the minimum tolerance value.

Figure 12:
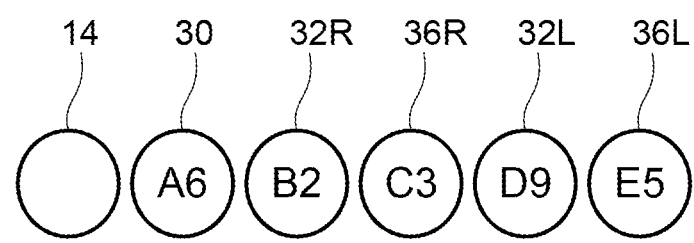
FIG. 12 is a schematic view showing each part that has been selected to form a vehicle front suspension.

Next, the recording and calculation unit 12 instructs that parts be selected by displaying identification numbers of the respective parts selected in the above-described optimal solution selection on the part selection instruction unit 22, or the like. Note that, as is shown in FIG. 12, the respective parts selected in the above-described optimal solution selection are the body 14, the suspension member 30 having the identification number A6, the right-side lower arm 32R having the identification number B2, the right-side knuckle 36R having the identification number C3, the left-side lower arm 32L having the identification number D9, and the left-side knuckle 36L having the identification number E5. Next, based on the information displayed on the part selection instruction unit 22, the respective parts selected in the above-described optimal solution selection are conveyed manually or automatically to an assembly work unit.

Figure 13:
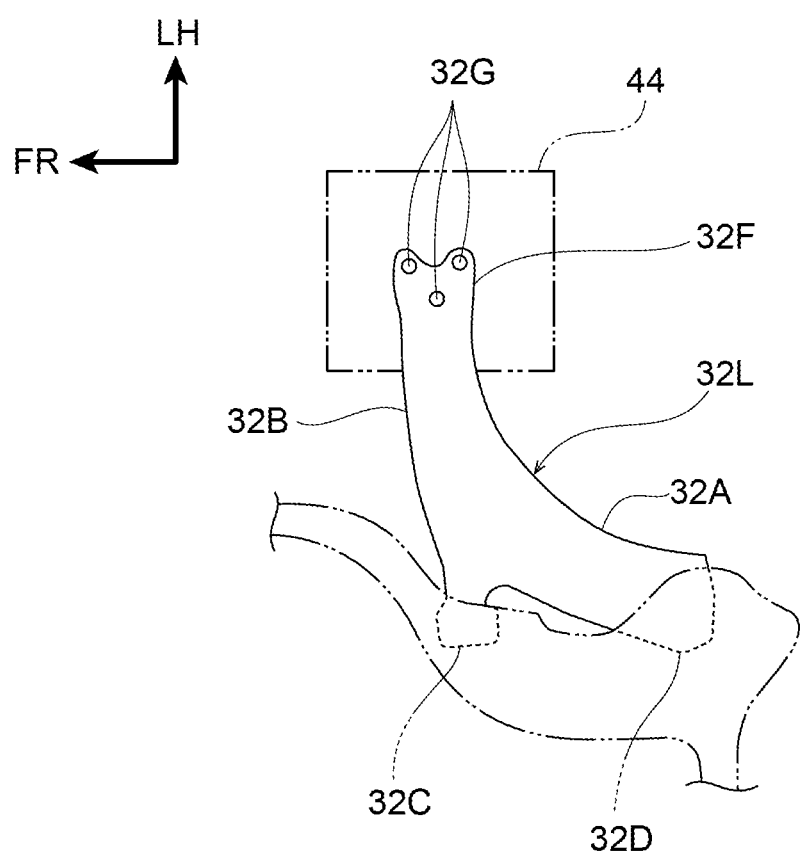
FIG. 13 is a schematic view showing a process in which a left-side lower arm is mounted on a suspension member.

Next, as is shown in FIG. 1 and FIG. 13, and also in FIG. 6 and FIG. 8, in the assembly work unit, the suspension member 30 having the identification number A6 is fixed in a fixed jig (not shown in the drawings) that forms part of the part supporting unit 24. Next, a bolt (not shown in the drawings) is inserted through the insertion hole 32E in the front-side mounting portion 32C of the left-side lower arm 32L having the identification number D9 and into the front-side lower arm mounting portion 30F of the suspension member 30 having the identification number A6, and a bolt (not shown in the drawings) is inserted through the insertion hole 32E in the rear-side mounting portion 32D of this lower arm 32L and is screwed into a nut portion provided in the rear-side lower arm mounting portion 30G of the suspension member 30. At this time, the bolts and nuts are only loosely fastened together. Next, the ball joint mounting portion 32F of the left-side lower arm 32L having the identification number D9 is fixed in a movable jig 44 that forms another part of the part supporting unit 24. Next, the movable jig 44 moves automatically to a predetermined position relative to the fixed jig. As a result, the mutual positions relative to each other of the left-side lower arm 32L having the identification number D9 and the suspension member 30 having the identification number A6 are set in the mutual positions relative to each other that were determined in the above-described positioning process. Next, in a state in which the mutual positions relative to each other of the left-side lower arm 32L having the identification number D9 and the suspension member 30 having the identification number A6 have been set in the mutual positions relative to each other that were determined in the above-described positioning process, the bolts and nuts are tightly fastened together. As a result, the mounting of the left-side lower arm 32L having the identification number D9 onto the suspension member 30 having the identification number A6 is completed. Note that, in FIG. 14, which is used in the following process description, bolts 46 that are inserted through the insertion hole 32E in the front-side mounting portion 32C of the left-side lower arm 32L having the identification number D9, and through the insertion hole 32E in the rear-side mounting portion 32D of this left-side lower arm 32L are shown.

Figure 14:
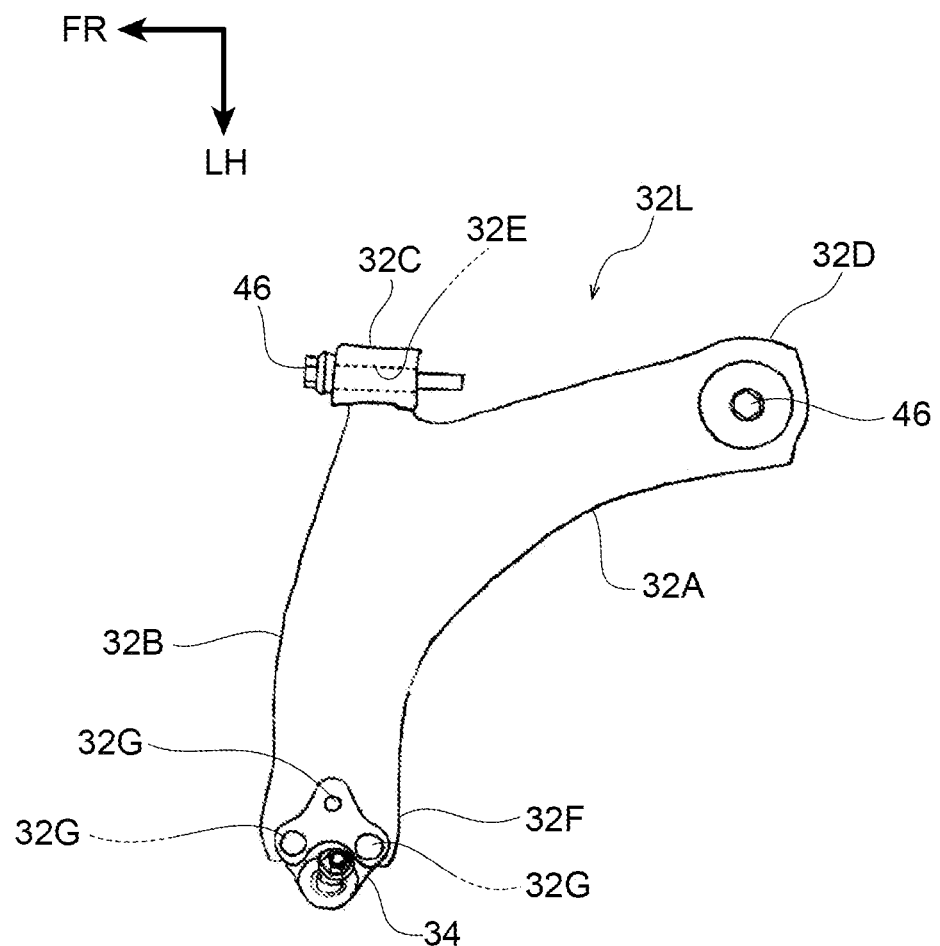
FIG. 14 is a schematic view showing a process in which a ball joint is mounted on a left-side lower arm.

Next, as is shown in FIG. 1 and FIG. 14, and also in FIG. 8, the bolt that has been inserted into one insertion hole 32G out of the three insertion holes 32G that are formed in the ball joint mounting portion 32F of the left-side lower arm 32L having the identification number D9 is screwed into the nut portion provided in the ball joint 34, and nuts are also screwed onto end portions of the bolts (i.e., the bolts that are fixed to the ball joint 34 side) that have been inserted into the remaining two insertion holes 32G out of the three insertion holes 32G. At this time, the bolts and nuts are only loosely fastened together. Next, the ball joint 34 is fixed in a ball joint supporting jig (not shown in the drawings) that forms another part of the part supporting unit 24. Next, this ball joint supporting jig (not shown in the drawings) moves automatically to a predetermined position relative to the left-side lower arm 32L having the identification number D9. As a result, the position of the ball joint 34 relative to the left-side lower arm 32L having the identification number D9 is set to a position that takes into consideration the mutual positions relative to each other of the left-side lower arm 32L having the identification number D9 and the left-side knuckle 36L having the identification number E5. In this state, the bolts and nuts are tightly fastened together. As a result, the mounting of the ball joint 34 onto the ball joint mounting portion 32F of the left-side lower arm 32L having the identification number D9 is completed.

Next, the shaft portion of the ball joint 34 that is mounted on the ball joint mounting portion 32F of the left-side lower arm 32L having the identification number D9 is inserted into the shaft portion insertion hole 36F that is formed in the ball joint mounting portion 36D of the left-side knuckle 36L having the identification number E5, and a nut that has been screwed onto the shaft portion of the ball joint 34 is fastened tight. As a result, the mounting of the left-side knuckle 36L having the identification number E5 onto the left-side lower arm 32L having the identification number D9 via the ball joint 34 is completed.

Next, as is shown in FIG. 4, the two bolts 48 are inserted into the two insertion holes 36G that are formed in the coilover mounting portion 36E of the left-side knuckle 36L having the identification number E5, and into the lower end portion 40A of the coilover 40. The nuts screwed onto the end portions of the two bolts 48 are then fastened tight. As a result, the mounting of the lower end portion 40A of the coilover 40 onto the coilover mounting portion 36E of the left-side knuckle 36L having the identification number E5 is completed. Note that, in the same way as in the above-described mounting of the respective parts, the nuts screwed onto the end portions of the two bolts 48 are fastened tight once the coilover 40 has been placed in a predetermined position relative to the left-side knuckle 36L having the identification number E5.

In addition, the mounting of the right-side lower arm 32R having the identification number B2 onto the suspension member 30 having the identification number A6, the mounting of the ball joint 34 onto the right-side lower arm 34R having the identification number B2, the mounting of the right-side knuckle 36R having the identification number C3 onto the right-side lower arm 32R having the identification number B2 via the ball joint 34, and the mounting of the lower end portion 40A of the coilover 40 onto the coilover mounting portion 36E of the right-side knuckle 36R having the identification number C3 are each achieved via the same procedure as that described above.

The front suspension 18 is assembled via the above-described process.

Figure 15:
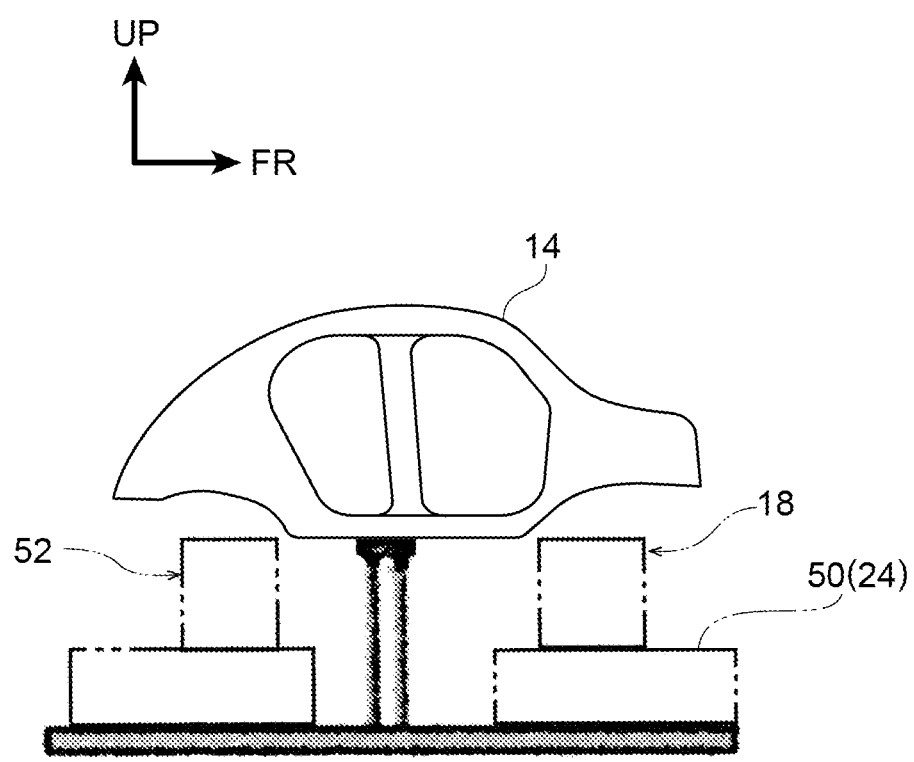
FIG. 15 is a schematic view showing a process in which a suspension member is mounted on a body.

Next, as is shown in FIG. 1 and FIG. 15, by causing a front suspension supporting portion 50 that forms part of the part supporting unit 24 to move automatically, the front suspension 18 that is supported on the front suspension supporting portion 50 is engaged with the body 14. In this state, the mutual positions relative to each other of each part forming the body 14 and the front suspension 18 are set to the mutual positions relative to each other that were determined in the above-described positioning process. In this state, the bolts inserted into the insertion holes 30E formed in the front-side mounting portion 30C and the rear-side mounting portion 30D of the suspension member 30 having the identification number A6 are screwed into nut portions (not shown in the drawings) that are provided on the body 14 side. As a result, the mounting of the suspension member 30 onto the body 14 is completed. In addition, the upper end portion 40B of the pair of left and right coilovers 40 is also fixed to the body 14.

The above-described process in which the front suspension 18 is assembled and process in which the front suspension 18 is mounted onto the body 14 form the assembling process.

Actions and Effects of the Present Exemplary Embodiment

Next, actions and effects of the present exemplary embodiment will be described.

As is shown in FIG. 1 through FIG. 15, in the above-described present exemplary embodiment, in the combining process, respective parts are selected from among the body 14, the ten suspension members 30, the ten right-side lower arms 32, the ten right-side knuckles 36, the ten left-side lower arms 32, and the ten left-side knuckles 36, and combinations of each of these parts are determined such that amounts of deviation thereof relative to reference values for the camber angle $\theta 1$, the caster angle $\theta 2$, the vehicle front-rear position IL of the vehicle wheel 28, and the position IW in the vehicle width direction of the vehicle wheel 28 are reduced as much as possible. Consequently, it is possible to improve the accuracy of the camber angle $\theta 1$, the caster angle $\theta 2$, the vehicle front-rear position IL of the vehicle wheel 28, and the position IW in the vehicle width direction of the vehicle wheel 28 of a completed vehicle relative to reference values.

In addition to this, in the present exemplary embodiment, in the positioning process, the mutual positions relative to each other of the parts are determined. Moreover, in the assembling process, once these mutual positions relative to each other of the parts have been determined, the bolts and nuts are fastened together. As a result, it is possible to improve even further the accuracy of the camber angle $\theta 1$, the caster angle $\theta 2$, the vehicle front-rear position IL of the vehicle wheel 28, and the position IW in the vehicle width direction of the vehicle wheel 28 of a completed vehicle relative to reference values.

Moreover, in the present exemplary embodiment, in the assembling process, the vehicle parts are selected with priority given to those vehicle parts having the oldest procurement date from among the types of vehicle parts of which there are a plurality in stock. Because of this, it is possible to inhibit vehicle parts having the oldest procurement date from among the types of vehicle parts of which there are a plurality in stock from continuing to remain in stock.

Note that, in the same way as the front suspension 18, a rear suspension 52 (see FIG. 15) is also assembled and then mounted onto the body 14 via the same type of process.

(Measurement Process and Combining Process that Take Vehicle Height into Consideration)

Figure 2:
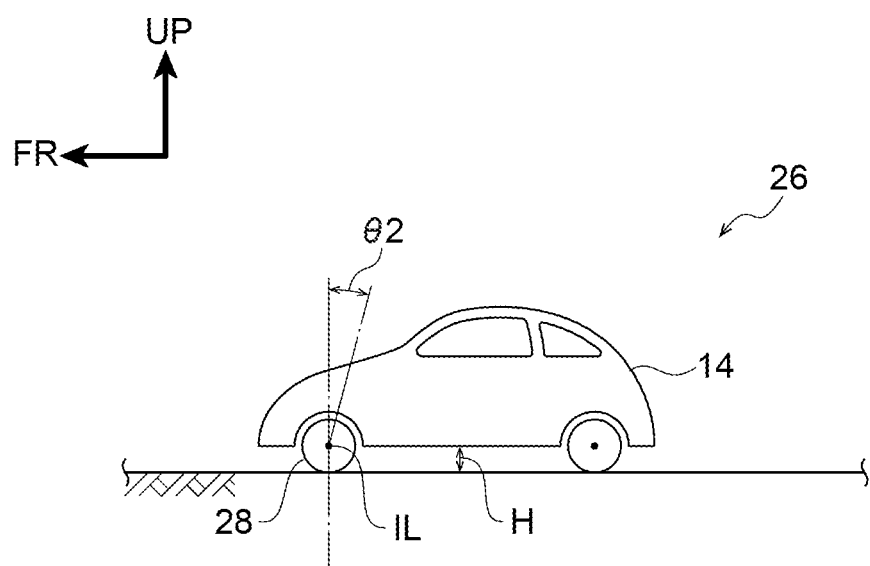
FIG. 2 is a side view showing a vehicle.
Figure 3:
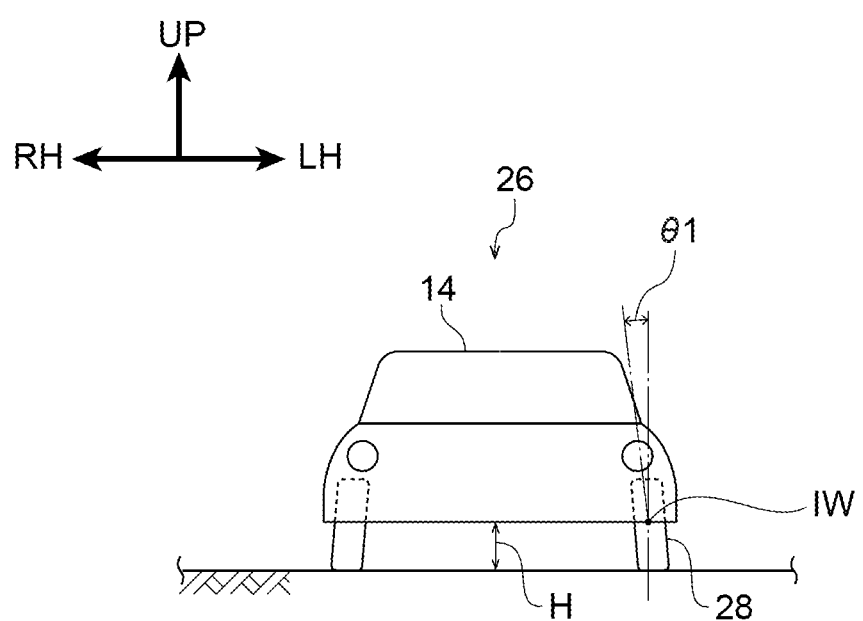
FIG. 3 is a front view showing a vehicle.

Next, as is shown in FIG. 2 and FIG. 3, measurement process and combining process that take into consideration a vehicle height H (i.e., an undercarriage ground clearance) of the vehicle 26 will be described.

Figure 16:
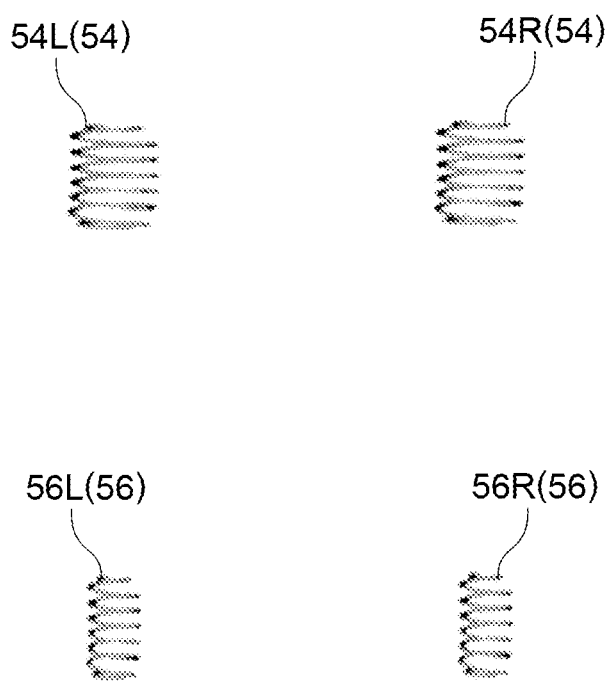
FIG. 16 is a view showing coil springs that are used to form a portion of a vehicle front and rear suspensions.

Two coil springs 54 that form part of the front suspension 18 of a vehicle (see FIG. 4), and two coils springs 56 that form part of the rear suspension 52 of a vehicle (see FIG. 15) are shown in FIG. 16. Note that, of the two coils springs 54, one coil spring 54 is expanded and contracted in accordance with the movement of the right-side front wheel, while the other coil spring 54 out of the two coil springs 54 is expanded and contracted in accordance with the movement of the left-side front wheel. In addition, when a distinction is to be made in the following description between the right-side coil spring 54 and the left-side coil spring 54, the right-side coil spring 54 is referred to as the 'coil spring 54R', while the left-side coil spring 54 is referred to as the 'coil spring 54L'. Moreover, of the two coils springs 56, one coil spring 56 is expanded and contracted in accordance with the movement of the right-side rear wheel, while the other coil spring 56 out of the two coil springs 56 is expanded and contracted in accordance with the movement of the left-side rear wheel. In addition, when a distinction is to be made in the following description between the right-side coil spring 56 and the left-side coil spring 56, the right-side coil spring 56 is referred to as the 'coil spring 56R', while the left-side coil spring 56 is referred to as the 'coil spring 56L'.

Figure 17:
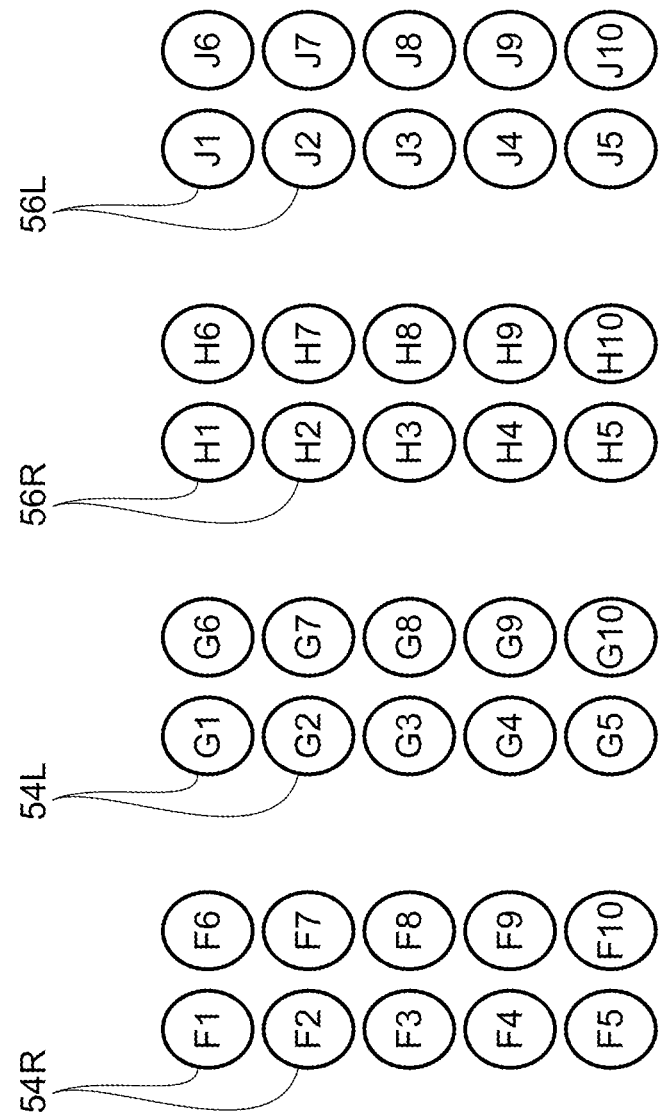
FIG. 17 is a schematic view showing stocks of each coil spring.

The right-side coil spring 54R, the left-side coil spring 54L, the right-side coil spring 56R, and the left-side coil spring 56L are shown schematically in FIG. 17. As is shown in FIG. 17, the number of parts held in stock of each of the right-side coil spring 54R, the left-side coil spring 54L, the right-side coil spring 56R, and the left-side coil spring 56L is ten.

Firstly, as is shown in FIG. 1 and FIG. 17, the free length, set load, and spring constant of the right-side coil spring 54R are measured using the suspension part measurement unit 20. Note that these measurements are made using a spring tester as the suspension part measurement unit 20. These measurements of the right-side coil spring 54R are repeated for all of the ten items held in stock. The resulting measurement values of the ten right-side coil springs 54R are each recorded in the recording and calculation unit 12 either automatically or manually. In addition, data for the procurement dates of each of the ten right-side coil springs 54R is also recorded in the recording and calculation unit 12 either automatically or manually. Note that, in order to simplify the description, identification numbers F1-F10 are attached respectively to the ten right-side coil springs 54R.

Next, the free length, set load, and spring constant of the left-side coil spring 54L are measured using the suspension part measurement unit 20. These measurements of the left-side coil spring 54L are repeated for all of the ten items held in stock. The resulting measurement values of the ten left-side coil springs 54L are each recorded in the recording and calculation unit 12 either automatically or manually. In addition, data for the procurement dates of each of the ten left-side coil springs 54L is also recorded in the recording and calculation unit 12 either automatically or manually. Note that, in order to simplify the description, identification numbers G1-G10 are attached respectively to the ten left-side coil springs 54L.

Next, the free length, set load, and spring constant of the right-side coil spring 56R are measured using the suspension part measurement unit 20. These measurements of the right-side coil spring 56R are repeated for all of the ten items held in stock. The resulting measurement values of the ten right-side coil springs 56R are each recorded in the recording and calculation unit 12 either automatically or manually.

In addition, data for the procurement dates of each of the ten right-side coil springs 56R is also recorded in the recording and calculation unit 12 either automatically or manually. Note that, in order to simplify the description, identification numbers H1-H10 are attached respectively to the ten right-side coil springs 56R.

Next, the free length, set load, and spring constant of the left-side coil spring 56L are measured using the suspension part measurement unit 20. These measurements of the left-side coil spring 56L are repeated for all of the ten items held in stock. The resulting measurement values of the ten left-side coil springs 56L are each recorded in the recording and calculation unit 12 either automatically or manually. In addition, data for the procurement dates of each of the ten left-side coil springs 56L is also recorded in the recording and calculation unit 12 either automatically or manually. Note that, in order to simplify the description, identification numbers J1-J10 are attached respectively to the ten left-side coil springs 56L.

The above-described process is employed as the measuring process, however, the sequence in which the respective parts are measured may be altered as is appropriate.

Next, based on the data for the respective parts obtained in the measurement process, the recording and calculation unit 12 selects respective parts from among the ten right-side coil springs 54R, the ten left-side coil springs 54L, the ten right-side coil springs 56R, and the ten left-side coil springs 56L, and decides on optimum combinations thereof such that an amount of deviation (hereinafter, referred to as a 'vehicle height deviation amount') relative to reference values of the vehicle height H at positions that correspond to each of the vehicle wheels is reduced as much as possible.

More specifically, firstly, the recording and calculation unit 12 calculates vehicle height deviation amounts for all possible combinations of each part out of the ten right-side coil springs 54R, the ten left-side coil springs 54L, the ten right-side coil springs 56R, and the ten left-side coil springs 56L (i.e., a round-robin calculation).

Next, based on the results of the above-described round-robin calculation, the recording and calculation unit 12 decides on combinations of each part that enable the sum of the following (1) through (6) to fall within a predetermined range (i.e., first combination deciding process).
(1) Vehicle height deviation amount at a position corresponding to the vehicle wheel in the right-front position.
(2) Vehicle height deviation amount at a position corresponding to the vehicle wheel in the left-front position.
(3) Vehicle height deviation amount at a position corresponding to the vehicle wheel in the right-rear position.
(4) Vehicle height deviation amount at a position corresponding to the vehicle wheel in the left-rear position.
(5) Difference between (1) and (3), which are vehicle height deviation amounts on the vehicle right side, and (2) and (4), which are vehicle height deviation amounts on the vehicle left side.
(5) Difference between (1) and (2), which are vehicle height deviation amounts on the vehicle front side, and (3) and (4), which are vehicle height deviation amounts on the vehicle rear side.

Next, the recording and calculation unit 12 decides on a combination, from among the combinations of each part determined in the first combination deciding process, that enables the difference between the above-described (3) and (4) to fall within a predetermined range (i.e., second combination deciding process).

Next, the recording and calculation unit 12 decides on a combination, from among the combinations of each part determined in the second combination deciding process, that contains parts having the oldest procurement date (i.e., third combination deciding process). In a case in which there are a plurality of combinations that contain parts having the oldest procurement date, the recording and calculation unit 12 decides on a combination, from among the combinations of each part determined in the third combination deciding process, in which the difference between the above-described (1) and (2) is the smallest (i.e., final combination deciding process).

The above-described process is combining process, however, other search conditions may be used as the search conditions under which the combinations of each part are determined upon in the combining process.

Figure 18:
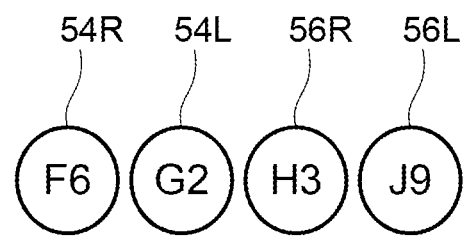
FIG. 18 is a schematic view showing selected coil springs.

As is shown in FIG. 18, the respective parts that are selected via the above-described processes are the right-side coil spring 54R having the identification number F6, the left-side coil spring 54L having the identification number G2, the right-side coil spring 56R having the identification number H3, and the left-side coil spring 56L having the identification number J9. By assembling the front suspension 18 and the rear suspension 52 using these parts, it is possible to reduce the vehicle height deviation amount in positions that correspond to the respective vehicle wheels.

Note that the above-described vehicle part assembly apparatus and vehicle part assembly method can be applied not only when assembling vehicle suspensions, but also when assembling other parts of a vehicle.

Figure 19:
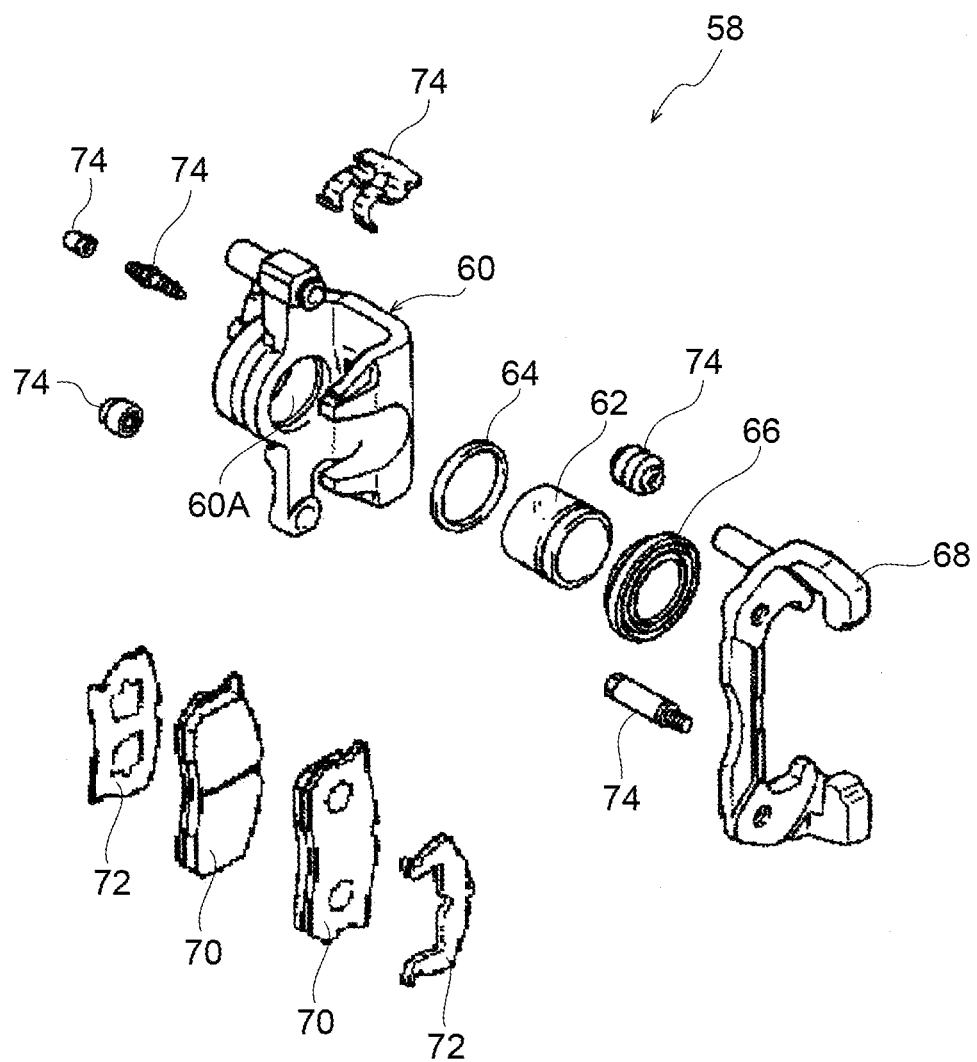
FIG. 19 is an exploded perspective view showing a disassembled caliper assembly.

For example, the above-described vehicle part assembly apparatus and vehicle part assembly method can also be applied when assembling a caliper assembly 58 shown in FIG. 19. Here, the caliper assembly 58 is provided with a caliper main body 60 having a cylinder portion 60A of which one side is open, a piston 62 that is housed inside the cylinder portion 60A of the caliper main body 60, an oil seal 64, and a dust cover 66. In addition, the caliper assembly 58 is also provided with a caliper mount 68, a pair of brake pads 70, a pair of packing plates 72, and a plurality of additional parts 74.

The dimensions and the like of each of the brake pads 70, the caliper main body 60, and the piston 62, which are parts that have a considerable influence on the braking force, are measured in the measurement process. The measurements of the brake pads 70, the caliper main body 60, and the piston 62 are repeated for all of these parts that are held in stock. Next, in the combining process, optimal combinations are determined from among the respective brake pads 70, caliper main bodies 60, and pistons 62 that are held in stock so as to ensure that the braking force of the caliper assembly 58 closely approximates reference values. By then assembling the caliper assembly 58 using the respective parts that have been determined in this process, it is possible to bring the braking force of the caliper assembly 58 close to the reference values.

Note also that the above-described vehicle part assembly apparatus and vehicle part assembly method can be applied not only when assembling vehicle parts using nuts and bolts, but also when assembling vehicle parts by welding or the like.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A method comprising:
measuring at least one of a dimension or a characteristic of each vehicle part of a plurality of types of vehicle parts, and, for each of the plurality of types of vehicle parts of which there are a plurality of vehicle parts in stock, measuring at least one of the dimension or the characteristic of each one of the plurality of vehicle parts that are in stock;
determining a combination of the plurality of types of vehicle parts by selecting specific vehicle parts from among the types of vehicle parts of which there are a plurality of vehicle parts in stock, such that the selected specific vehicle parts closely approximate specific vehicle specification reference values;
positioning, by determining mutual positions relative to each other, of the plurality of types of vehicle parts selected for the determined combination, in order to closely approximate the specific vehicle specification reference values; and
assembling the plurality of types of vehicle parts in accordance with the combination that has been determined, the assembling including assembling the plurality of types of vehicle parts at the mutual positions relative to each other determined in the positioning.

2. The method according to claim 1, wherein:
the positioning includes determining the mutual positions relative to each other of the plurality of types of vehicle parts under an assumption that the mutual positions relative to each other of the plurality of types of vehicle parts can only be moved by an amount that corresponds to a clearance between bolts and insertion holes into which the bolts are inserted, and
the assembling includes assembling the plurality of types of vehicle parts using the bolts.

3. The method according to claim 1, wherein selecting the specific vehicle parts includes prioritizing vehicle parts having an earliest procurement date among the types of vehicle parts of which there are a plurality in stock.

4. The method according to claim 1, wherein:
the plurality of types of vehicle parts include parts forming an undercarriage of a vehicle, and
the specific vehicle specifications include at least one of a camber angle, a caster angle, a position of a vehicle wheel in a vehicle front-rear direction, a position of a vehicle wheel in a vehicle width direction, or a vehicle height.

5. The method according to claim 1, wherein:
the plurality of types of vehicle parts include parts used to form brakes of a vehicle, and
the specific vehicle specifications include braking force.

6. A vehicle parts assembly apparatus, comprising:
a measurement data recording unit configured to store measurement data for at least one of a dimension or a characteristic of each vehicle part of a plurality of types of vehicle parts, and, for each of the plurality of types of vehicle parts of which there are a plurality of vehicle parts in stock, measurement data for at least one of the dimension or the characteristic of each one of the plurality of vehicle parts that are in stock;
a combination determination unit configured to, based on the measurement data stored in the measurement data recording unit, select specific vehicle parts from among the types of vehicle parts of which there are a plurality of vehicle parts in stock such that the selected vehicle parts closely approximate specific vehicle specification reference values, and determine a combination of the plurality of types of vehicle parts;
a position determination unit configured to determine mutual positions relative to each other of the plurality of types of vehicle parts in accordance with the combination determined by the combination determination unit in order to closely approximate the specific vehicle specification reference values; and
a part support unit configured to support the plurality of types of vehicle parts at the mutual positions relative to each other determined by the position determination unit.

7. A method comprising:
measuring at least one of a dimension or a characteristic of each vehicle part of a plurality of types of vehicle parts, and, for each of the plurality of types of vehicle parts of which there are a plurality of vehicle parts in stock, measuring at least one of the dimension or the characteristic of each one of the plurality of vehicle parts that are in stock;
determining a combination of the plurality of types of vehicle parts by selecting specific vehicle parts from among the types of vehicle parts of which there are a plurality of vehicle parts in stock, such that the selected specific vehicle parts closely approximate specific vehicle specification reference values; and
assembling the plurality of types of vehicle parts in accordance with the combination that has been determined,
wherein selecting the specific vehicle parts includes prioritizing vehicle parts having an earliest procurement date among the types of vehicle parts of which there are a plurality in stock.

* * * * *